(12) United States Patent
Suzuki et al.

(10) Patent No.: US 8,767,298 B2
(45) Date of Patent: Jul. 1, 2014

(54) IMAGING LENS

(75) Inventors: Hisanori Suzuki, Sukagawa (JP);
Shingo Watanabe, Sukagawa (JP);
Kenichi Kamada, Sukagawa (JP);
Kazuo Matsuoka, Saitama (JP)

(73) Assignee: Kantatsu Co., Ltd., Yaita-shi, Tochigi (JP)

( * ) Notice: Subject to any disclaimer, the term of this patent is extended or adjusted under 35 U.S.C. 154(b) by 0 days.

(21) Appl. No.: 13/316,690

(22) Filed: Dec. 12, 2011

(65) Prior Publication Data
US 2012/0162769 A1 Jun. 28, 2012

(30) Foreign Application Priority Data

Dec. 28, 2010 (JP) ................... 2010-293634

(51) Int. Cl.
*G02B 5/18* (2006.01)
*G02B 27/42* (2006.01)

(52) U.S. Cl.
USPC ............................ 359/558; 359/708; 359/715

(58) Field of Classification Search
USPC ......... 359/708, 715, 716, 717, 718, 557, 558, 359/642
See application file for complete search history.

(56) References Cited

U.S. PATENT DOCUMENTS

| 2010/0254023 A1* | 10/2010 | Ito ................................. | 359/682 |
| 2010/0265380 A1* | 10/2010 | Fukuta ........................... | 348/335 |

FOREIGN PATENT DOCUMENTS

| JP | 2004-252099 A | 9/2004 |
| JP | 2007-264180 A | 10/2007 |
| JP | 2010-008562 A | 1/2010 |
| JP | 2010-026434 A | 2/2010 |
| JP | 2010-197665 A | 9/2010 |
| JP | 2010-262269 A | 11/2011 |

OTHER PUBLICATIONS

Japanese Office Action dated May 7, 2014 issued in corresponding Japanese Patent Application No. 2010-293634, w/ English translation (4 pages).

* cited by examiner

*Primary Examiner* — James Greece
*Assistant Examiner* — Sharrief Broome
(74) *Attorney, Agent, or Firm* — Westerman, Hattori, Daniels & Adrian, LLP

(57) ABSTRACT

An imaging lens with large aperture ratio, high-performance and low-cost is provided, which is applied to an imaging element of a small-size and high resolution, in which aberration is corrected satisfactorily and sufficient diffraction resolution is achieved. An imaging lens includes a first lens, a second lens, a third lens, a fourth lens, and a fifth lens arranged in sequence from an object side, wherein both surfaces of each lens are formed from aspheric surface, a diffraction optics surface exerting chromatic dispersion function is arranged on a surface on an image side of the second lens, each lens is configured from plastic material, and an aperture ratio is equal to or smaller than F/2.4.

2 Claims, 8 Drawing Sheets

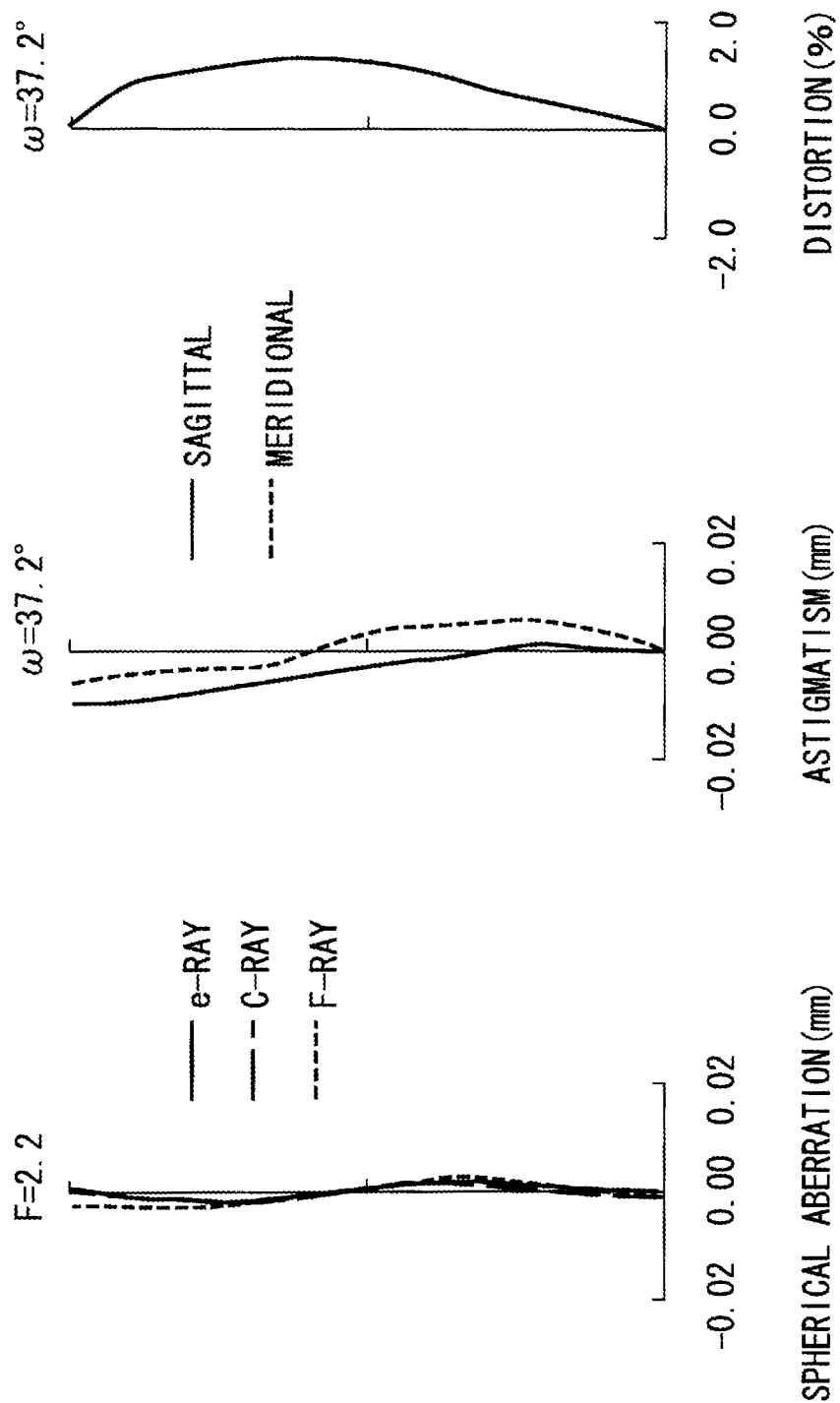

IMAGING LENS

The present application is based on and claims priority of Japanese patent application No. 2010-293634 filed on Dec. 28, 2010, the entire contents of which are hereby incorporated by reference.

BACKGROUND OF THE INVENTION

1. Field of the Invention

The present invention relates to an imaging lens with high resolution and large aperture ratio, for imaging in broadband light such as white light, and with broad angle of field, and for example, relates to a small-sized imaging lens mounted on portable telephones and the like.

2. Description of the Related Art

Recently, downsizing of the imaging lens is progressing rapidly, accompanying the transition from photograph film to imaging elements such as CCD and CMOS. Since imaging lens is mounted on portable telephones and the like, there are increasing demands for reducing cost by mass consumption, and on the other hand, there are demands to solve technical problems such as extreme reduction in thickness and restrictions in light incident angle of the imaging elements.

Further, along with the downsizing of the imaging element, pixels are increasing, and the pixel size is minimized significantly. The imaging lens to be applied to such imaging elements is not only required to have various aberrations corrected satisfactorily, but also highly requested to have large aperture ratio in order to obtain sufficient diffraction resolution. In order to satisfy such requests, there are demands for a more compact imaging lens, having larger aperture ratio and having high performance with reduced costs.

Accompanying increased pixels of the imaging elements, for example, imaging lens of five-lens configuration are proposed in Japanese Patent Laid-Open 2007-264180 (Patent document 1), Japanese Patent Laid-Open 2010-197665 (Patent document 2), and Japanese Patent Laid-Open 2010-262269 (Patent document 3).

Recently, the superficial content where the imaging element receives light has a tendency of increasing in proportion to increase in pixels of the imaging element. Therefore, even when the aperture ratio of the imaging lens is around F/2.8, it had been possible to provide practical imaging lens such as those shown in Patent document 1 or Patent document 2. However, the downsizing and increasing in pixels of the imaging element is further enhanced recently, and imaging elements having pixel size of approximately 1 µm have been provided. Generally, when the pixel size decreases, the light receiving area of each pixel decreases, so that the image obtained through the imaging element becomes dark. In order to correspond to such small pixel size, fast imaging lens is desired. That is, the imaging lens is required to achieve F/2.4 through F/1.8 and to obtain sufficient diffraction limit. Patent document 3 responds to these requests by providing an imaging lens of five-lens configuration having approximately F/2.4 through F/2.04, however, it cannot be said that sufficient performance is realized. Further, since glass material is heavily used, it is impossible to realize cost reduction.

In order to realize both downsizing and increasing performance, the imaging lens of five-lens configuration are proposed in Patent documents 1 through 3, however, it is difficult to realize increased aperture ratio and enhanced performance. Further, when plastic material is selected for cost reduction, since the applicable lens material is limited, it is difficult to achieve both correction of chromatic aberration and correction of other various aberrations.

SUMMARY OF THE INVENTION

The present invention has been made in view of problems mentioned above, and aims to provide an imaging lens of a five-lens configuration which is capable of correcting chromatic aberration effectively, and to achieve both correction of other various aberrations, which has large aperture ratio, high performance, and is low-cost.

In order to solve the above-mentioned problem, an imaging lens of Aspect 1 is an imaging lens for an imaging element, comprising a first lens, a second lens, a third lens, a fourth lens, and a fifth lens arranged in sequence from an object side, wherein both surfaces of each lens are formed from aspheric surface, a diffraction optics surface exerting chromatic dispersion function is arranged on a surface on an image side of the second lens, each lens is configured from plastic material, and an aperture ratio is equal to or smaller than F/2.4.

The configuration mentioned above realizes placement of the diffraction optics surface to a surface most appropriate for correcting various aberrations satisfactorily and correction of the chromatic aberration satisfactorily.

The diffraction optics surface is configured from a relief for generating an optical path difference defined by an optical path difference function. Normally, dispersion of glass is Abbe number of 25 to 80 at e-ray, the diffraction optics surface is approximately −3.5, and having a property of indicating roughly one digit larger diffraction with reversed sign. In the case of correcting the chromatic aberration with ordinary optical materials such as glass, normally the lens is configured by combining at least two different materials having different dispersion. However, by arranging the diffraction optics surface to one surface of the lens system, it becomes possible to exert large chromatic dispersion function, and consequently to realize correction of the chromatic aberration.

On the other hand, the diffraction optics surface has extremely high diffraction efficiency with respect to standard design wavelength. However, it has a drawback that the diffraction efficiency drops if the wavelength deviates from the standard design wavelength or when the angle of incidence of light becomes larger, and it is desired to minimize the influence of these drawbacks as much as possible.

In the lens system generally configured from plural lenses, in the case of intending to correct the chromatic aberration, a configuration of using high dispersion material to one lens and arranging the same in a position close to the diaphragm is commonly adopted. By arranging the diffraction optics surface similarly to the position close to the diaphragm, it is effective in the correction of the chromatic aberration for both axial and extra-axial.

The position of the diffraction optics surface is arranged at the most appropriate surface according to conditions including the number of lens, total length of the lens, and manufacturable thickness of each lens. In order to correspond to broad angle of field, the lens configuration of aspect 1 is arranged at the surface near concentric with respect to the diaphragm, that is, to the surface on the image side of the second lens. If the position of the diffraction optics surface becomes closer to the object from this lens surface, correction of the chromatic aberration of magnification becomes insufficient, and if it becomes closer to the image surface than this lens surface, correction becomes excessive.

For easier manufacturing and decreased cost, all the lenses are configured from plastic material in Aspect 1. However, because of the limitation in the selectable plastic material, even aiming at simultaneously optimizing both of various aberrations and the field curvature, the correction of the chromatic aberration remains insufficient. Therefore, in aspect 1, remaining chromatic aberration is removed by the diffraction optics surface.

Further, the imaging lens of Aspect 2 is characterized in that the first lens has a convex surface on the object side and has a positive or a negative power, the second lens is configured from the convex surface on both sides, the third lens is configured from a meniscus lens having a concave surface at the object side and having negative power, the fourth surface has a convex surface on the image side and has a positive power, a fifth lens is configured from the meniscus lens having the convex surface on the object side, and an aperture stop is arranged on the object side than the second lens.

Aspect 2 enables to shorten the overall length and to correct coma aberration easily by making the surface on the object side of the first lens a convex surface, and having a relative small positive or negative power. Further, by making both surface of the second lens to be convex-shaped, the spherical aberration is suppressed.

Further, by making the surface on the image side of the fourth lens convex so as to have a positive power, and by making the surface on the object side of the third lens concave, and the surface on the image side convex, the total optical length is shortened. Further, by the third lens having a negative power and the fourth lens having a positive power, axial chromatic aberration and the chromatic aberration of magnification are effectively corrected. Moreover, in the configuration of Aspect 2, with the aim of correcting the chromatic aberration, a material having high chromatic dispersivity is used for the third lens, and strong concave surface is arranged to the object side. Therefore, in combination with the chromatic aberration correction effect of the diffraction optics surface arranged on the image side of the second lens, more satisfactory chromatic aberration correction effect is realized.

Further, for the fifth lens, by forming the aspheric surface effectively by making the object side a convex meniscus shape, distortion is corrected satisfactorily, and the light emission angle is optimized.

Further, by arranging the diaphragm on the object side than the surface on the object side of the second lens, the light emission angle is made smaller. On the other hand, in order to perform aberration correction satisfactorily with respect to the broad angle of field, it is necessary to correct the field curvature satisfactorily. According to the lens configuration of Aspect 2, the third lens greatly contributes to the correction of the field curvature.

Further, the imaging lens of Aspect 3 is characterized in that the imaging lens satisfies the following conditional expressions:

$$0.9 < f/f_{12} < 1.2 \quad (1)$$

$$-0.23 < f/f_{34} < 0.12 \quad (2)$$

$$-0.72 < f/f_1 < 0.1 \quad (3)$$

$$|f/f_5| < 0.2 \quad (4)$$

where
f: focal length of overall system
$f_{12}$: composite focal length of the first lens and the second lens
$f_{34}$: composite focal length of the third lens and the fourth lens
$f_1$: focal length of the first lens
$f_5$: focal length of the fifth lens.

The conditional expression (1) is a condition for correcting the coma aberration with respect to extra-axial light satisfactorily, by suppressing generation of the spherical aberration by making the composite power of the first lens and the second lens to a value close to the power of approximately the whole system. If the value drops below the lower limit value of "0.9" of the conditional expression (1), it is effective for shortening the total length but becomes difficult to increase the aperture ratio because the burden of the spherical aberration correction becomes larger. On the other hand, if the value exceeds the upper limit value of "1.2", it becomes easier to increase the aperture ratio, but is difficult to reduce size.

The conditional expression (2) is a condition for satisfactorily correcting the axial chromatic aberration and the chromatic aberration of magnification. If the value drops below the lower limit value of "-0.23" of the conditional expression (2), the value of the conditional expression (1) becomes comparatively larger, so that the spherical aberration or the coma aberration becomes deteriorated. On the other hand, if the value exceeds the upper limit value of "0.12", the field curvature becomes deteriorated, so that it becomes difficult to increase the aperture ratio or have broad angle of field.

Further, in order to shorten the total length, by making the composite power of the third lens and the fourth lens a small value, it becomes possible to make the total length minimum while maintaining the aberration correction balance.

The conditional expression (3) is a condition for maintaining the total optical length short and for satisfactorily correcting the coma aberration. If the value drops below the lower limit value of "-0.72" of the conditional expression (3), it becomes difficult to reduce size. On the other hand, if the value exceeds the upper limit value of "0.1", the flipping up of the light beam becomes larger, and it becomes difficult to correct the coma aberration.

The conditional expression (4) is a condition for optimizing the power of the fifth lens. If the negative power becomes larger, back focus may be secured but the composite power of the first lens through the fourth lens becomes comparatively larger, so that increasing of the aperture ratio becomes difficult. On the other hand, if the positive power becomes larger, it becomes difficult to secure the back focus, and it becomes difficult to arrange the cover glass or the filter.

When the lens system is regarded by two groups in which the first lens and the second lens becomes a front group and the third lens, the fourth lens, and the fifth lens becomes a rear group, the front group is the group with the main power, and the rear group has small power and mainly contributes to the extra-axial aberration correction. The third lens and the fourth lens of the rear group contribute to the shortening of the total length, and the fifth lens contributes to the light emission angle and the distortion correction.

BRIEF DESCRIPTION OF THE DRAWINGS

FIG. 8 is an aberration diagram of the imaging lens related to Embodiment 4.

DETAILED DESCRIPTION OF THE PREFERRED EMBODIMENT

Hereinafter, the embodiments of the present invention will be explained with reference to the accompanying drawings. First, as a representative example of the present invention, embodiment 1 will be explained in detail. For subsequent embodiments, duplicate explanation will be omitted.

Embodiment 1

Figure 1:
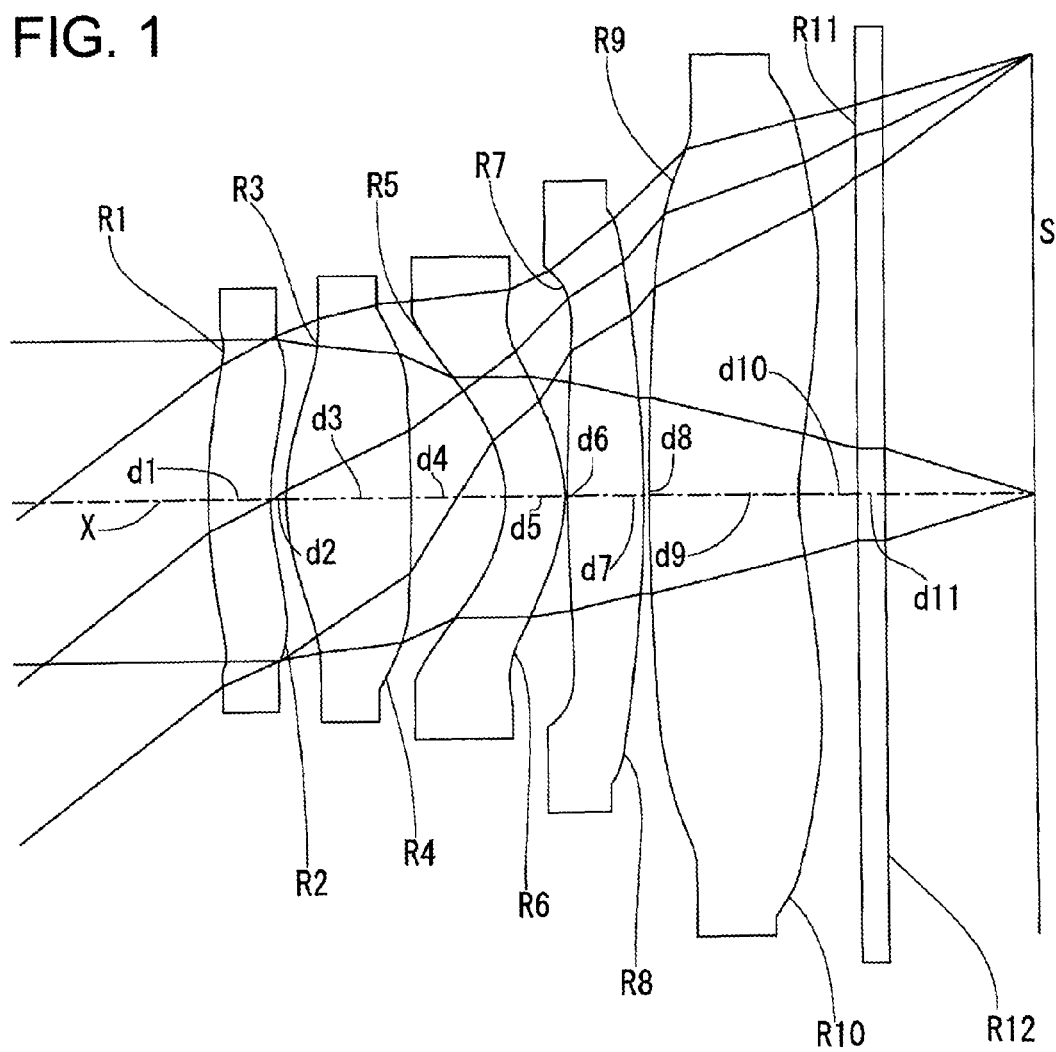
FIG. 1 is a configuration diagram of the imaging lens related to Embodiment 1.

FIG. 1 shows a configuration diagram of an imaging lens according to an embodiment of the present invention. In the drawing, a first lens is configured from a convex surface at a surface on an object side, and has a weak negative power. Further, a second lens is configured from convex surfaces at both surfaces, and a third lens is a meniscus lens having negative power, with a concave surface at a surface on the object side near an optical axis. Further, a fourth lens is configured from a convex surface at a surface on an image side near the optical axis, and has a positive power. A fifth lens is a meniscus lens with a convex surface at the surface on the object side near the optical axis.

Further, both surfaces of each lens are configured from aspheric surfaces, and the surface on the image side of the second lens is provided with a diffraction optics surface exerting chromatic dispersion function. Also, every lens is configured from a plastic material.

In the present embodiment, a rim of the effective diameter of a surface R2 on the image side of the first lens doubles the effect of a diaphragm. Cover glasses configured from R11, R12 are arranged between a surface R10 on the image side of the fifth lens and an image-forming surface S. Further, in FIG. 1, d1, d2, . . . , d11 represent surface intervals, and X represent the optical axis, respectively.

The lens surfaces R1, R2, . . . , R10 are formed from aspheric surfaces represented by Equation 1. The aspheric shape adopted to these lens surfaces are, when the displacement amount in the optical axis X direction is taken as Z, the height in the direction orthogonal to the optical axis X as Y, the eccentricity as K, and the aspheric coefficient as $A_{2i}$, represented by the following equation. The lens surface R2 is formed with the diffraction optics surface of an optical path difference function represented by Equation 2, on the aspheric surface which becomes the basis.

$$Z = \frac{\frac{Y^2}{R}}{1+\sqrt{1-K \times \frac{Y^2}{R^2}}} + \sum_{i=2}^{10} A_{2i} \times Y^{2i}$$ [Equation 1]

where
Z: displacement amount in the X-axis direction (image surface direction being positive) from the optical axis
Y: height from the optical axis
A2i: aspheric coefficient (i=1-10)
K: eccentricity
R: paraxial curvature radius of the aspheric surface $$P = \sum_{i=1}^{5} B_{2i} Y^{2i}$$ [Equation 2]

where
p: optical path difference (unit: wave number)
$B_{2i}$: optical path difference function (i=1-5)

Table 1 shows the curvature radius R of each lens, the surface interval d of each surface on the optical axis, the refractive index n at e-ray of the lens material, and the Abbe number v, in the case where the focal length of all system of embodiment 1 is normalized to f=1.0.

Further, the F-number and a half angle of image ω of the embodiment 1 are indicated at the bottom line of the table. In Table 1 and following tables, the numbers corresponding to each reference sequentially increase from the object side.

TABLE 1

Embodiment 1
Surface data

| Surface No. | R | d | n | v | Effective diameter |
|---|---|---|---|---|---|
| Object Surface | ∞ | ∞ | | | |
| 1 | 0.6961 | 0.1110 | 1.53690 | 56.3 | 0.309 |
| 2 (diaphragm) | 0.4019 | 0.0253 | | | 0.281 |
| 3 | 0.3495 | 0.2178 | 1.53690 | 56.3 | 0.312 |
| 4 (diffraction optics surface) | −6.9392 | 0.1689 | | | 0.332 |
| 5 | −0.2082 | 0.1012 | 1.61988 | 25.6 | 0.345 |
| 6 | −0.3496 | 0.0033 | | | 0.360 |
| 7 | 1.1473 | 0.1361 | 1.53690 | 56.3 | 0.395 |
| 8 | −4.9802 | 0.0033 | | | 0.492 |
| 9 | 0.6891 | 0.2692 | 1.53690 | 56.3 | 0.654 |
| 10 | 0.7477 | 0.1000 | | | 0.717 |
| 11 | ∞ | 0.0484 | 1.51872 | 64.2 | 0.736 |
| 12 | ∞ | 0.2581 | | | 0.742 |
| Image surface | ∞ | | | | | f = 1.000, Fno = 1.8, ω = 37.2°

Table 2 shows the aspheric coefficient and the values of each constant of the optical path difference function of the diffraction optics surface in Embodiment 1.

Table 2

Embodiment 1

Aspheric Surface Data
First Surface
Aspheric Coefficient
K=−8.2055
A4=−0.14250673E+1
A6=−0.15398119E+2
A8=0.29721504E+3
A10=−0.82925962E+4
A12=0.58698022E+5
A14=−0.75034191E+5
A16=−0.43083295E+6
Second Surface
Aspheric Coefficient
K=0.9087
A4=−0.21905004E+2
A6=0.21209148E+3
A8=−0.45499369E+4
A10=0.61978045E+5

A12=-0.43700376E+6
A14=0.12528813E+7
Third Surface
Aspheric Coefficient
K=0.0249
A4=-0.11867183E+2
A6=0.10211791E+3
A8=-0.98096964E+3
A10=-0.25571016E+5
A12=-0.25571016E+5
A14=-0.70814894E+7
A16=0.24370137E+8
Fourth Surface (the Diffraction Optics Surface)
Aspheric Coefficient
K=-0.43743450E+3
A4=-0.88736166E+0
A6=-0.45096375E+2
A8=0.93537909E+3
A10=-0.56944080E+5
A12=0.11195156E+7
A14=-0.91414818E+7
A16=0.27984495E+8
Optical Path Difference Function Coefficient
B2=-0.54094213E+2
B4=0.23812736E+2
B6=0.11920174E+5
B8=-0.87589610E+5
Reference Wavelength of the Optical Path Difference Function
$\lambda_0$=520.0 nm
Fifth Surface
Aspheric Coefficient
K=-0.8864
A4=0.59191096E+1
A6=-0.15537832E+3
A8=0.16889775E+4
A10=0.47570021E+5
A12=-0.11019688E+7
A14=0.82330921E+7
A16=-0.21334082E+8
Sixth Surface
Aspheric Coefficient
K=0.7715
A4=-0.15629774E+0
A6=0.53253930E+2
A8=0.40361074E+1
A10=0.17578494E+5
A12=-0.22466809E+6
A14=0.77957674E+6
A16=0.19809768E+6
Seventh Surface
Aspheric Coefficient
K=2.2778
A4=-0.40849059E+1
A6=-0.66317929E+2
A8=0.19240169E+4
A10=-0.20836936E+5
A12=0.10864403E+6
A14=-0.24526392E+6
Eighth Surface
Aspheric Coefficient
K=-3.4315
A4=-0.26394615E+1
A6=-0.54204995E+2
A8=0.12345042E+4
A10=-0.85439132E+4
A12=0.25053122E+5
A14=-0.26034469E+5
A16=-0.37882034E+4
Ninth Surface
Aspheric Coefficient
K=0.8196
A4=-0.11861502E+2
A6=0.85148634E+2
A8=-0.30947133E+3
A10=0.56314423E+3
A12=-0.42149997E+3
A14=0.12173449E+0
Tenth Surface
Aspheric Coefficient
K=0.2720
A4=-0.49877404E+1
A6=0.20826951E+2
A8=-0.78510412E+2
A10=0.16626186E+3
A12=-0.14514275E+3
A14=0.10486676E+2

The imaging lens of Embodiment 1, as is indicated below, satisfies conditional expressions (1), (2), (3), and (4).

$$f/f_{12}=1.091 \tag{1}$$

$$f/f_{34}=-0.187 \tag{2}$$

$$f/f_1=-0.490 \tag{3}$$

$$|f/f_5|=0.159 \tag{4}$$

Figure 2:
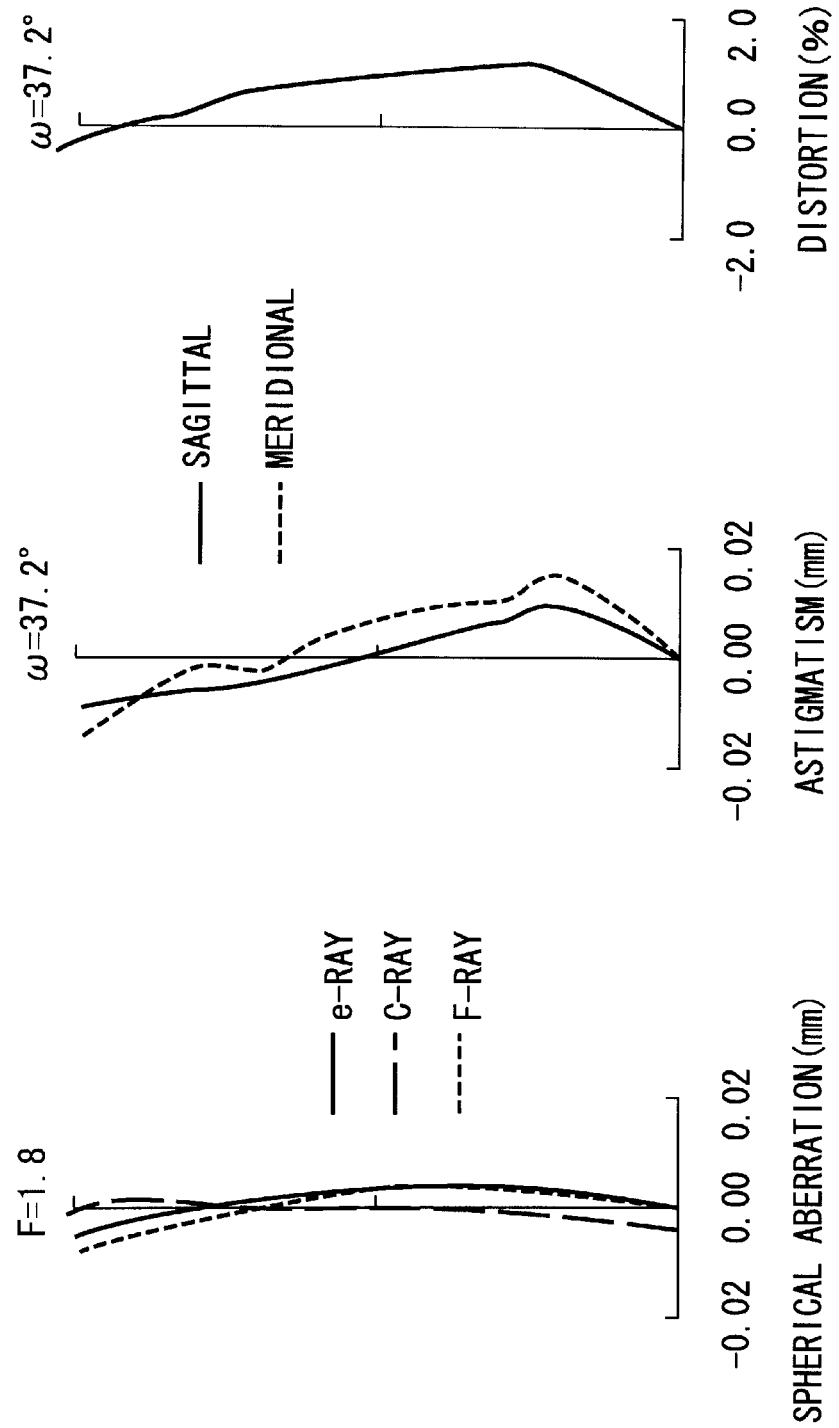
FIG. 2 is an aberration diagram of the imaging lens related to Embodiment 1.
Figure 3:
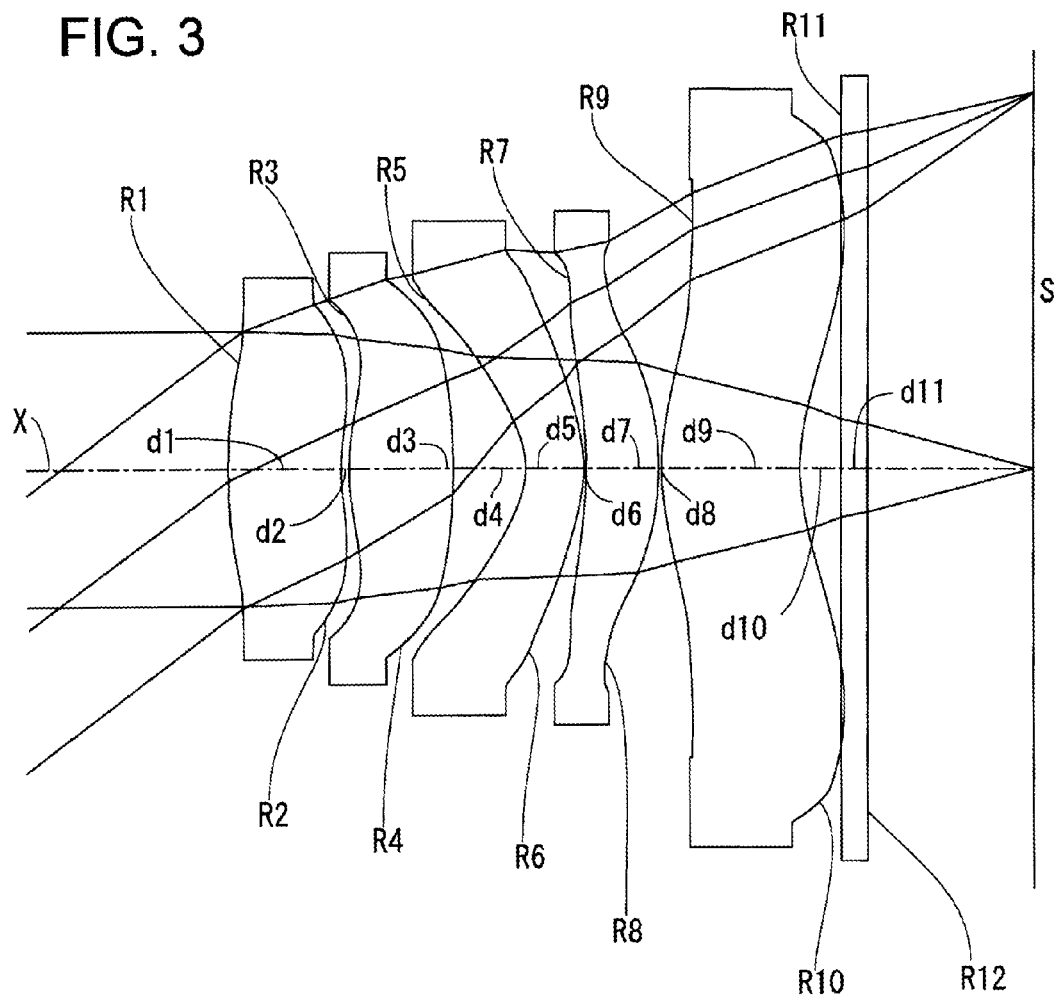
FIG. 3 is a configuration diagram of the imaging lens related to Embodiment 2.

FIG. 2 shows the spherical aberration (mm), astigmatic aberration (mm), and distortion (%) of the imaging lens of Embodiment 1. In these aberration diagrams, the spherical aberration shows the aberration amount with respect to each wavelength of F-ray (486.13 nm), e-ray (546.07 nm), C-ray (656.27 nm), and the astigmatic aberration shows the aberration amount at sagittal image surface and the aberration amount in the meridional image surface (same applies to FIGS. 4, 6, and 8).

As shown in FIG. 2, according to the imaging lens related to Embodiment 1, chromatic aberration is corrected satisfactorily, and other aberrations are also corrected satisfactorily.

Embodiment 2

The imaging lens related to Embodiment 2 has approximately the same lens configuration as Embodiment 1. However, in the present embodiment, the rim of the effective diameter of the surface R1 on the object side of the first lens doubles the effect of the diaphragm.

Table 3 shows the curvature radius R of each lens, the surface interval d of each surface on the optical axis, the refractive index n at e-ray of the lens material, and the Abbe number ν, in the case where the focal length of all system of embodiment 2 is normalized to f=1.0. Further, the F-number and a half angle of image ω of embodiment 2 are indicated at the bottom line of the table. In Table 3 and following tables, the numbers corresponding to each reference sequentially increase from the object side.

TABLE 3

Embodiment 2
Surface data

| Surface No. | R | d | n | v | Effective diameter |
|---|---|---|---|---|---|
| Object surface | ∞ | ∞ | | | |
| 1 (diaphragm) | 1.0220 | 0.2227 | 1.53690 | 56.3 | 0.278 |
| 2 | 0.7560 | 0.0180 | | | 0.335 |
| 3 | 0.5221 | 0.2055 | 1.53690 | 56.3 | 0.338 |
| 4 (diffraction optics surface) | −2.5128 | 0.1428 | | | 0.384 |
| 5 | −0.2493 | 0.1144 | 1.58821 | 30.2 | 0.397 |
| 6 | −0.4638 | 0.0033 | | | 0.446 |
| 7 | −1.0337 | 0.1517 | 1.53690 | 56.3 | 0.442 |
| 8 | −0.4520 | 0.0033 | | | 0.469 |
| 9 | 0.5851 | 0.2705 | 1.53690 | 56.3 | 0.605 |
| 10 | 0.5022 | 0.1000 | | | 0.716 |
| 11 | ∞ | 0.0481 | 1.51872 | 64.2 | 0.734 |
| 12 | ∞ | 0.3103 | | | 0.740 |
| Image surface | ∞ | | | | | f = 1.000, Fno = 1.8, ω = 37.2°

Table 4 shows the aspheric coefficient and the values of each constant of the optical path difference function of the diffraction optics surface in embodiment 2.

[Table 4]
Aspheric Surface Data
First Surface
Aspheric Coefficient
K=−8.2055
A4=−0.13671097E+0
A6=−0.97893512E+1
A8=0.14272884E+3
A10=−0.40653863E+4
A12=0.42248518E+5
A14=−0.22190818E+6
A16=0.11967548E+6
Second Surface
Aspheric Coefficient
K=1.0000
A4=−0.11246618E+2
A6=−0.45160186E+2
A8=0.10982410E+4
A10=−0.11189086E+5
A12=0.70273250E+5
A14=−0.12967788E+6
A16=−0.67979450E+6
Third Surface (the Diffraction Optics Surface)
Aspheric Coefficient
K=2.1444
A4=−0.10412103E+2
A6=−0.42103670E+2
A8=−0.19806887E+3
A10=0.22472449E+4
A12=0.96547603E+4
A14=−0.17207314E+6
A16=0.91460735E+5
Fourth Surface (the Diffraction Optics Surface)
Aspheric Coefficient
K=−0.43743450E+3
A4=−0.33310369E+1
A6=0.31916929E+2
A8=−0.17191783E+4
A10=0.15306425E+5
A12=−0.21207724E+5
A14=−0.30667204E+6
A16=0.12304064E+7
The Optical Path Difference Function Coefficient
B2=−0.44096005E+2
B4=0.34658522E+3
B6=−0.43609058E+3
B8=−0.99468175E+4
Reference Wavelength of the Optical Path Difference Function
λ₀=520.0 nm
Fifth Surface
Aspheric Coefficient
K=−0.1715
A4=−0.26122779E+1
A6=−0.21069889E+2
A8=0.46723436E+3
A10=−0.36944581E+4
A12=0.22131240E+5
A14=−0.42530257E+5
A16=−0.56041480E+5
Sixth Surface (the Diffraction Optics Surface)
Aspheric Coefficient
K=−1.6530
A4=0.25763136E+1
A6=0.33317865E+2
A8=−0.27458727E+3
A10=0.26284574E+3
A12=0.34134066E+4
A14=−0.81105417E+4
A16=−0.14993691E+4
Seventh Surface (the Diffraction Optics Surface)
Aspheric Coefficient
K=−1.6530
A4=0.27855769E+1
A6=0.79534501E+1
A8=−0.10815701E+3
A10=0.55489275E+2
A12=0.93287938E+3
A14=−0.19023023E+4
A16=−0.39710652E+4
Eighth Surface (the Diffraction Optics Surface)
Aspheric Coefficient
K=−1.6530
A4=−0.32489311E+1
A6=0.15921347E+2
A8=0.15303170E+3
A10=−0.91597590E+3
A12=0.12216120E+4
A14=0.37437064E+3
A16=0.85803107E+3
Ninth Surface (the Diffraction Optics Surface)
Aspheric Coefficient
K=−1.6530
A4=−0.51431229E+1
A6=0.11616262E+2
A8=−0.18381364E+2
A10=0.30709170E+2
A12=−0.75133625E+2
A14=0.21301797E+2
Tenth Surface (the Diffraction Optics Surface)
Aspheric Coefficient
K=−1.6530
A4=−0.47269713E+1
A6=0.12504631E+2
A8=−0.28442360E+2
A10=0.42382913E+2
A12=−0.38477782E+2
A14=0.10417318E+2

The imaging lens of Embodiment 2, as is indicated below, satisfies conditional expressions (1), (2), (3), and (4).

$$f/f_{12}=1.036 \quad (1)$$

$$f/f_{34}=0.083 \quad (2)$$

$$f/f_1=-0.131 \quad (3)$$

$$|f/f_5|=0.021 \quad (4)$$

Figure 4:
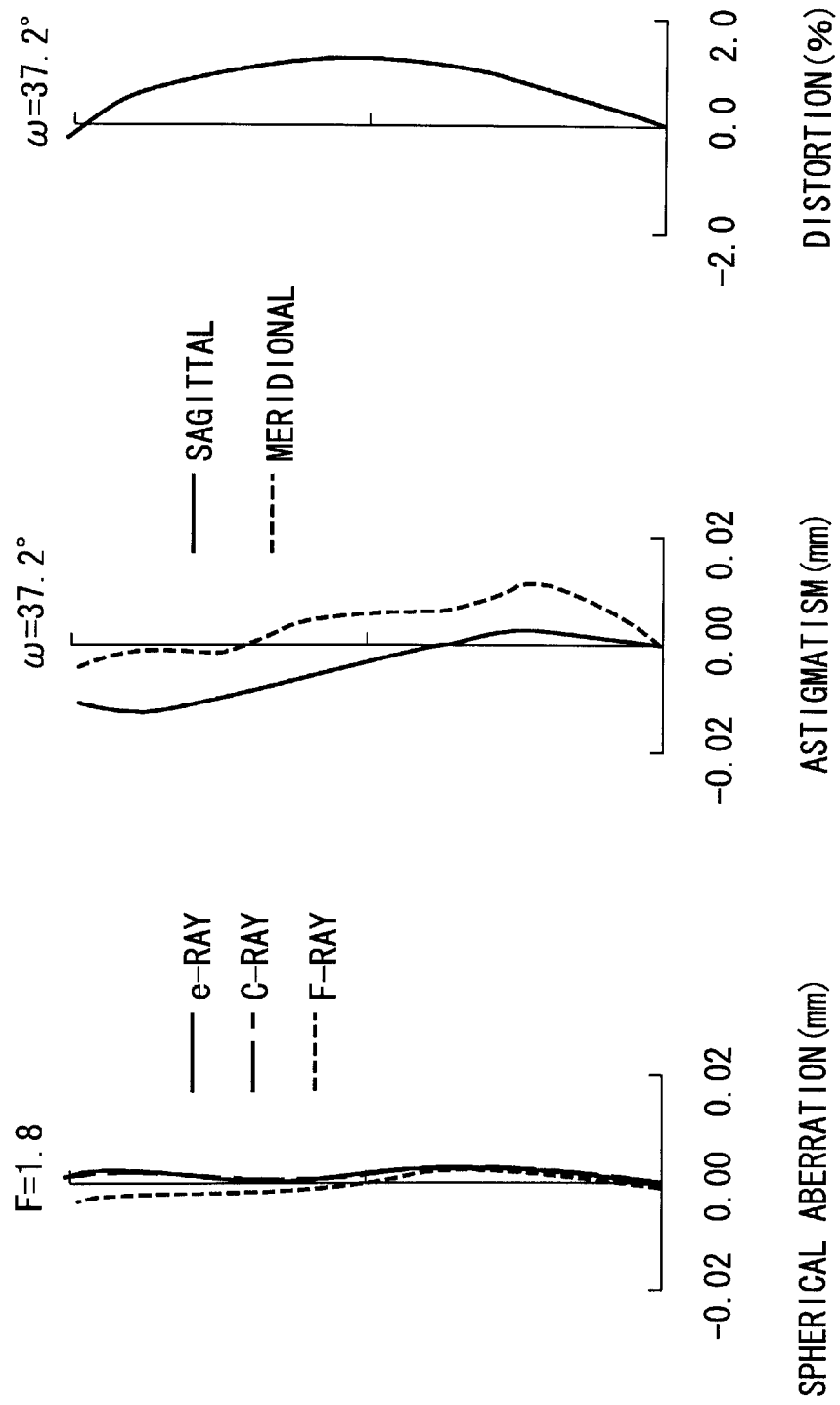
FIG. 4 is an aberration diagram of the imaging lens related to Embodiment 2
Figure 5:
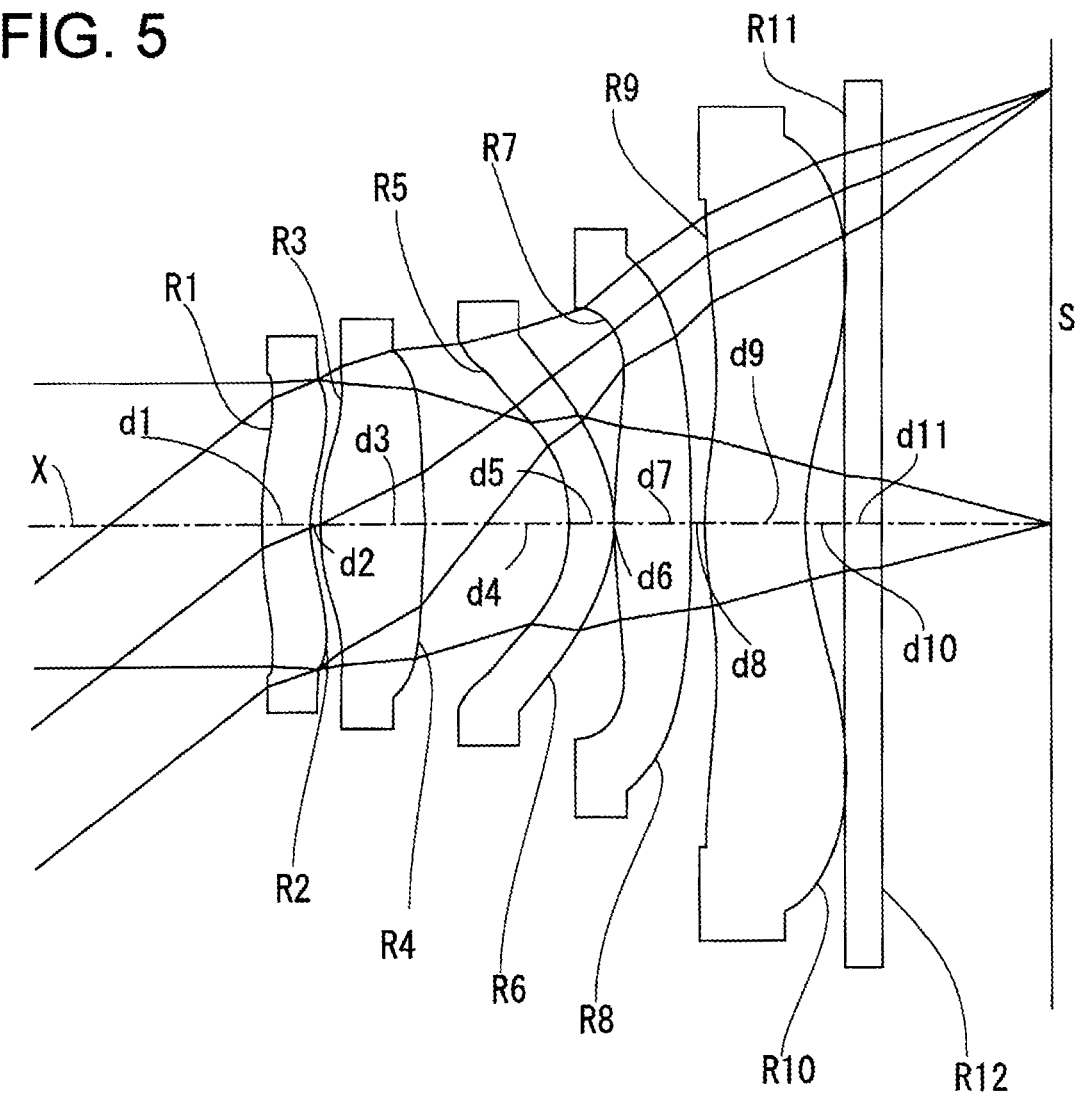
FIG. 5 is a configuration diagram of the imaging lens related to Embodiment 3.

As shown in FIG. 4, according to the imaging lens related to Embodiment 2, chromatic aberration is corrected satisfactorily, and other aberrations are also corrected satisfactorily.

Embodiment 3

The imaging lens related to Embodiment 3 has approximately the same lens configuration as Embodiment 1.

Table 5 shows the curvature radius R of each lens, the surface interval d of each surface on the optical axis, the refractive index n at e-ray of the lens material, and the Abbe number ν, in the case where the focal length of all system of embodiment 3 is normalized to f=1.0. Further, the F-number and a half angle of image ω of embodiment 3 are indicated at the bottom line of the table. In Table 5 and following tables, the numbers corresponding to each reference sequentially increase from the object side.

TABLE 5

Embodiment 3
Surface data

| Surface No. | R | d | n | ν | Effective diameter |
|---|---|---|---|---|---|
| Object surface | ∞ | ∞ | | | |
| 1 | 0.7162 | 0.0835 | 1.53690 | 56.3 | 0.279 |
| 2 (diaphragm) | 0.3644 | 0.0131 | | | 0.255 |
| 3 | 0.3655 | 0.1801 | 1.53690 | 56.3 | 0.274 |
| 4 (diffraction optics surface) | −2.5689 | 0.2552 | | | 0.306 |
| 5 | −0.1979 | 0.0717 | 1.61988 | 25.6 | 0.314 |
| 6 | −0.2909 | 0.0021 | | | 0.338 |
| 7 | 0.9947 | 0.1293 | 1.53690 | 56.3 | 0.382* |
| 8 | −11.1221 | 0.0222 | | | 0.465 |
| 9 | 0.4348 | 0.1744 | 1.53690 | 56.3 | 0.573 |
| 10 | 0.3766 | 0.1000 | | | 0.675 |
| 11 | ∞ | 0.0644 | 1.51872 | 64.2 | 0.710 |
| 12 | ∞ | 0.2473 | | | 0.724 |
| Image surface | ∞ | | | | | f = 1.000, Fno = 2.0, ω = 37.7°

Table 6 shows the aspheric coefficient and the values of each constant of the optical path difference function of the diffraction optics surface in embodiment 3.

Table 6

Embodiment 3

Aspheric Surface Data
First Surface
Aspheric Coefficient
K=−8.2055
A4=−0.50032628E+01
A6=0.13580390E+02
A8=−0.33977541E+03
A10=−0.75255085E+03
A12=−0.81068236E+05
A14=0.27750527E+07
A16=−0.24705214E+08
A18=0.62088156E+08
Second Surface
Aspheric Coefficient
K=1.0000
A4=−0.28042280E+02
A6=0.18906879E+03
A8=−0.49233304E+04
A10=0.91055287E+05
A12=−0.56975207E+06
A14=−0.20226564E+07
A16=0.24506630E+08
Third Surface
Aspheric Coefficient
K=−0.1465
A4=−0.14287467E+02
A6=0.13389684E+03
A8=−0.43787035E+04
A10=0.81012994E+05
A12=−0.35563865E+06
A14=−0.40847121E+07
A16=0.28295150E+08
Fourth Surface (the Diffraction Optics Surface)
Aspheric Coefficient
K=−0.43743450E+03
A4=−0.30094662E+01
A6=0.56498257E+02
A8=−0.23232519E+03
A10=−0.40772331E+05
A12=0.87285611E+06
A14=−0.76897077E+07
A16=0.24751730E+08
The Optical Path Difference Function Coefficient
B2=−0.64773767E+02
B4=0.96326411E+03
B6=−0.21530671E+05
B8=0.25286771E+06
B10=−0.10532158E+07
Reference Wavelength of the Optical Path Difference Function
$\lambda_0$=520.0 nm
Fifth Surface
Aspheric Coefficient
K=−0.5557
A4=0.75187738E+01
A6=−0.25467383E+03
A8=0.18219203E+04
A10=0.45388671E+05
A12=−0.12146727E+07
A14=0.11743658E+08
A16=−0.44826559E+08
A18=0.39171183E+08
Sixth Surface
Aspheric Coefficient
K=0.4157
A4=0.31683009E+01
A6=0.68687890E+01
A8=−0.87121875E+03
A10=0.24725487E+05
A12=−0.26510872E+06
A14=0.13071244E+07
A16=−0.18298526E+07
Seventh Surface
Aspheric Coefficient
K=2.4303
A4=−0.37696545E+01

A6=−0.53394185E+02
A8=0.14877636E+04
A10=−0.17904417E+05
A12=0.92656887E+05
A14=−0.89239495E+05
A16=−0.11716859E+07
A18=0.25043308E+07
Eighth Surface
Aspheric Coefficient
K=−0.12084200E+06
A4=−0.21673589E+01
A6=−0.52014500E+02
A8=0.11480935E+04
A10=−0.90788659E+04
A12=0.29447587E+05
A14=−0.25226537E+05
A16=−0.31987125E+05
Ninth Surface
Aspheric Coefficient
K=−1.2599
A4=−0.14660873E+02
A6=0.95439968E+02
A8=−0.31112404E+03
A10=0.55496385E+03
A12=−0.43781296E+03
A14=−0.61744719E+02
Tenth Surface
Aspheric Coefficient
K=−3.0916
A4=−0.52527758E+01
A6=0.28221868E+02
A8=−0.10296771E+03
A10=0.21083122E+03
A12=−0.17586587E+03
A14=−0.62888303E+01

The imaging lens of Embodiment 3, as is indicated below, satisfies conditional expressions (1), (2), (3), and (4).

$$f/f_{12}=1.004 \quad (1)$$

$$f/f_{34}=-0.035 \quad (2)$$

$$f/f_1=-0.664 \quad (3)$$

$$|f/f_5|=0.009 \quad (4)$$

Figure 6:
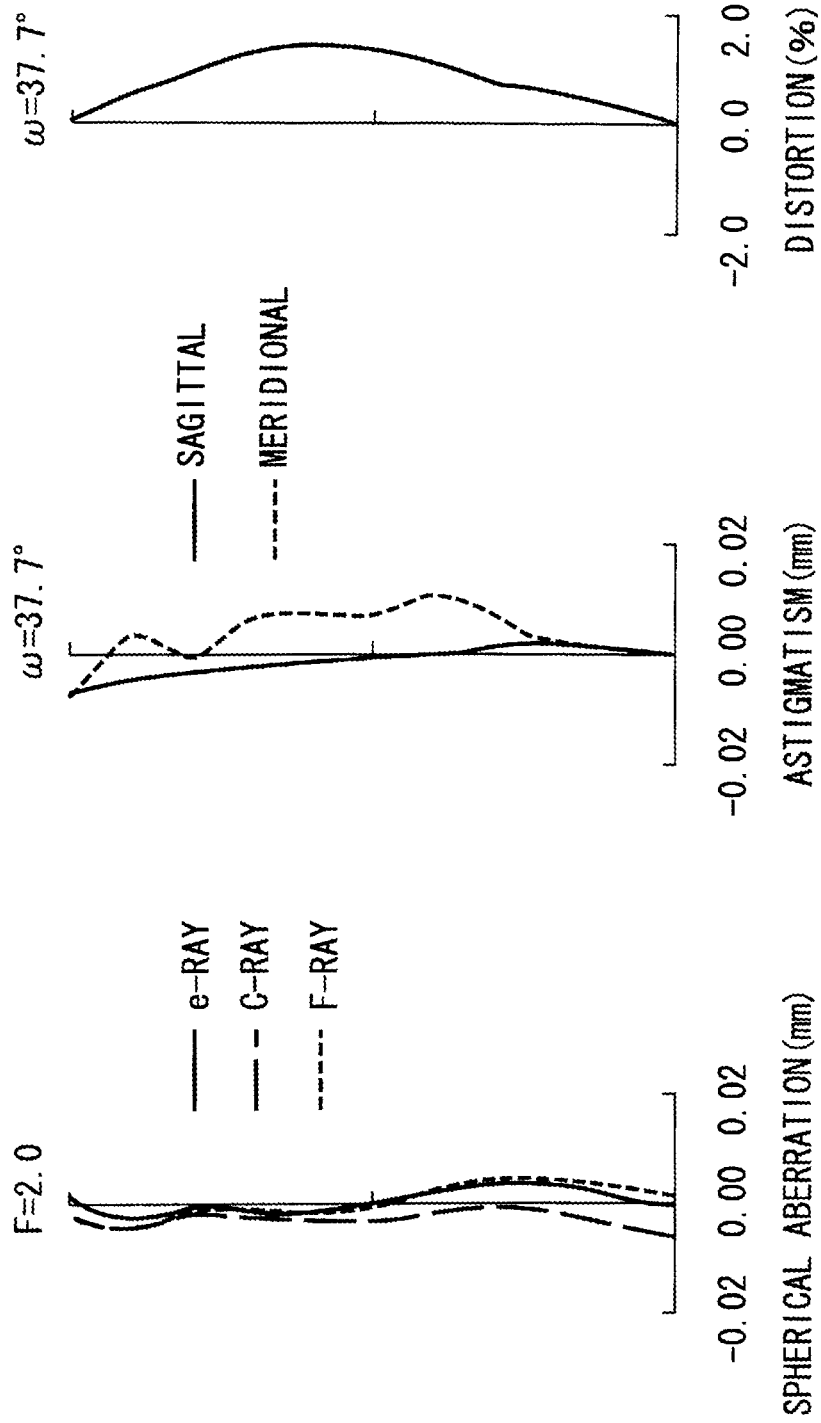
FIG. 6 is an aberration diagram of the imaging lens related to Embodiment 3.
Figure 7:
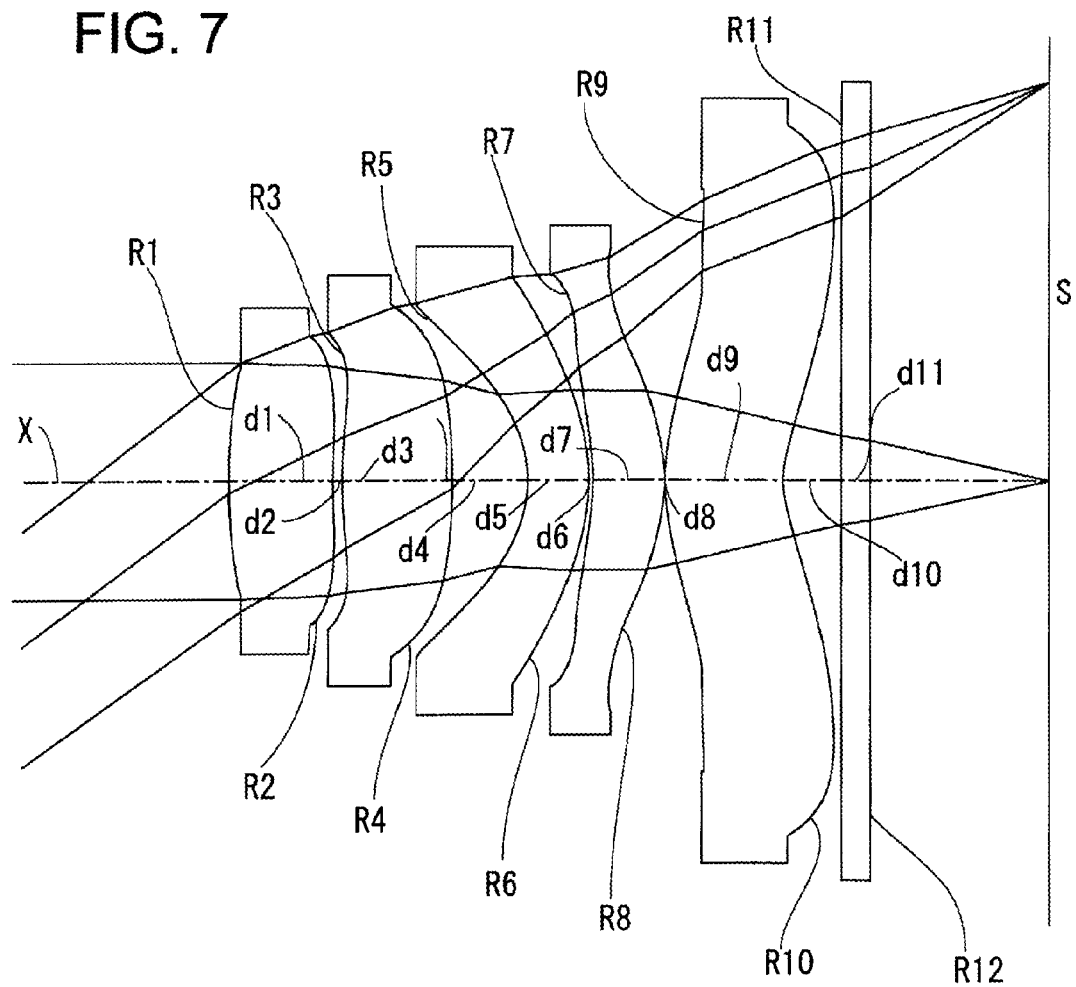
FIG. 7 is a configuration diagram of the imaging lens related to Embodiment 4.

As shown in FIG. 6, according to the imaging lens related to Embodiment 3, chromatic aberration is corrected satisfactorily, and other aberrations are also corrected satisfactorily.

Embodiment 4

The imaging lens related to Embodiment 4 has approximately the same lens configuration as Embodiment 1, except that in the present embodiment, the rim of the effective diameter of the surface R1 on the object side of the first lens doubles the effect of a diaphragm. Further, Embodiment 4 differs from Embodiment 1 that the first lens has a weak positive power.

Table 7 shows the curvature radius R of each lens, the surface interval d of each surface on the optical axis, the refractive index n at e-ray of the lens material, and the Abbe number ν, in the case where the focal length of all system of embodiment 4 is normalized to f=1.0. Further, the F-number and a half angle of image ω of embodiment 4 are indicated at the bottom line of the table. In Table 7 and following tables, the numbers corresponding to each reference sequentially increase from the object side.

TABLE 7

Embodiment 4
Surface data

| Surface No. | R | d | n | ν | Effective diameter |
|---|---|---|---|---|---|
| Object surface | ∞ | ∞ | | | |
| 1 (diaphragm) | 1.0085 | 0.1931 | 1.53690 | 56.3 | 0.227 |
| 2 | 1.0022 | 0.0179 | | | 0.280 |
| 3 | 0.6246 | 0.2054 | 1.53690 | 56.3 | 0.288 |
| 4 (diffraction optics surface) | −2.1845 | 0.1427 | | | 0.337 |
| 5 | −0.2433 | 0.1160 | 1.58821 | 30.2 | 0.342 |
| 6 | −0.4931 | 0.0033 | | | 0.394 |
| 7 | −0.9708 | 0.1353 | 1.53690 | 56.3 | 0.399 |
| 08 | −0.4389 | 0.0033 | | | 0.436 |
| 09 | 0.4670 | 0.2240 | 1.53690 | 56.3 | 0.639 |
| 10 | 0.4235 | 0.1500 | | | 0.709 |
| 11 | ∞ | 0.0485 | 1.51872 | 64.2 | 0.967 |
| 12 | ∞ | 0.2937 | | | 1.000 |
| Image surface | ∞ | | | | | f = 1.000, Fno = 2.2, ω = 37.2°

Table 8 shows the aspheric coefficient and the values of each constant of the optical path difference function of the diffraction optics surface in embodiment 4.

Table 8

Embodiment 4

Aspheric Surface Data
First Surface
Aspheric Coefficient
K=−8.2055
A4=−0.68773815D+00
A6=−0.11195311D+02
A8=0.28573118D+02
A10=−0.33952157D+04
A12=0.26541040D+05
A14=−0.20350117D+06
A16=0.10829619D+06
Second Surface
Aspheric Coefficient
K=1.0000
A4=−0.14291756D+02
A6=−0.28242726D+02
A8=0.10034659D+04
A10=−0.81149966D+04
A12=0.38529726D+05
A14=−0.11892126D+06
A16=−0.61515653D+06
Third Surface
Aspheric Coefficient
K=3.8523
A4=−0.13442614D+02
A6=−0.55661300D+02
A8=−0.18567278D+02
A10=0.53491132D+04
A12=−0.36707447D+05
A14=−0.15779988D+06
A16=0.82764231D+05
Fourth Surface (the Diffraction Optics Surface)
Aspheric Coefficient
K=−0.33422300D+03
A4=−0.45308624D+01
A6=0.56344820D+01

A8=−0.15144055D+04
A10=0.15181471D+05
A12=−0.21203382D+05
A14=−0.28123397D+06
A16=0.11134138D+07
Optical Path Difference Function Coefficient
B2=−0.44292608D+02
B4=0.18644585E+03
B6=0.21842368E+04
B8=−0.26346415E+05
Reference Wavelength of the Optical Path Difference Function
$\lambda_0$=520.0 nm
Fifth Surface
Aspheric Coefficient
K=1.1063
A4=−0.61362579E+01
A6=−0.33038064E+02
A8=0.67552729E+03
A10=−0.99744362D+03
A12=0.34220160E+04
A14=−0.39002424E+05
A16=−0.50712800E+05
Sixth Surface
Aspheric Coefficient
K=0.8551
A4=0.31683009E+01
A4=−0.73354632E+00
A6=0.37148452E+02
A8=−0.18517953E+03
A10=0.19566575E+03
A12=0.20914520E+04
A14=−0.74377822E+04
A16=−0.13568023E+04
Seventh Surface
Aspheric Coefficient
K=2.2778
A4=0.25822589E+01
A6=0.57793802E+01
A8=−0.11258448E+03
A10=0.19643387E+01
A12=0.46162059E+03
A14=−0.17445087E+04
A16=−0.35934782E+04
Eighth Surface
Aspheric Coefficient
K=−2.6917
A4=0.17935075E+01
A6=0.15209709E+02
A8=0.12663393E+03
A10=0.10133554E+04
A12=0.19046688E+04
A14=0.34331706E+03
A16=0.77644556E+03
Ninth Surface
Aspheric Coefficient
K=0.5326
A4=−0.69722465E+01
A6=0.15486355E+02
A8=−0.12718808E+02
A10=−0.33823095E+01
A12=−0.51690660E+02
A14=0.19534839E+02
Tenth Surface
Aspheric Coefficient
K=−0.0401
A4=−0.60729367E+01
A6=0.20084504E+02
A8=−0.51016087E+02
A10=0.84697067E+02
A12=−0.73587612E+02
A14=0.95532138E+01

The imaging lens of Embodiment 4, as is indicated below, satisfies conditional expressions (1), (2), (3), and (4).

$$f/f_{12}=1.076 \tag{1}$$

$$f/f_{34}=-0.044 \tag{2}$$

$$f/f_1=0.033 \tag{3}$$

$$|f/f_5|=0.094 \tag{4}$$

As shown in FIG. 8, according to the imaging lens related to Embodiment 4, chromatic aberration is corrected satisfactorily, and other aberrations are also corrected satisfactorily.

The effect of the present invention is as follow.

According to the present invention, it becomes possible to provide the imaging lens which is capable of satisfactorily correcting chromatic aberration than the prior lenses, and is capable of achieving both correction of other various aberrations, which is small-sized, have large aperture ratio, and has high performance, with five-lens configuration by arranging the diffraction optics surface at the optimum position.

Further, by using plastic material to every lens, it becomes possible to reduce cost.

INDUSTRIAL APPLICABILITY

As is explained above, according to the imaging lens of the present invention, it becomes possible to provide an imaging lens for large aperture ratio in which aberration is corrected satisfactorily. Further, it becomes possible to provide an imaging lens which could be applied to recent small-sized imaging element with increased pixels, which has higher performance and is smaller in size. Especially, it has great effect in the field of the imaging lens mounted on portable telephones with strong demand for downsizing and improving performance.

What is claimed is:

1. An imaging lens for an imaging element, comprising a first lens, a second lens, a third lens, a fourth lens, and a fifth lens arranged in sequence from an object side, wherein both surfaces of each lens are formed from aspheric surface, a diffraction optics surface exerting chromatic dispersion function is arranged directly on a surface on an image side of the second lens, each lens is configured from plastic material, and an aperture ratio is equal to or smaller than F/2.4, wherein the imaging lens satisfies the following conditional expressions:

$$0.9 < f/f_{12} < 1.2 \tag{1}$$

$$-0.23 < f/f_{34} < 0.12 \tag{2}$$

$$-0.72 < f/f_1 < 0.1 \tag{3}$$

$$|f/f_5| < 0.2 \tag{4}$$

where
f: focal length of overall system
$f_{12}$: composite focal length of the first lens and the second lens
$f_{34}$: composite focal length of the third lens and the fourth lens
$f_1$: focal length of the first lens
$f_5$: focal length of the fifth lens.

2. The imaging lens according to claim 1, wherein
the first lens has a convex surface on the object side and has a positive or a negative power,
the second lens is configured from the convex surface on both sides,
the third lens is configured from a meniscus lens having a concave surface at the object side and having negative power,
the fourth lens has a convex surface on the image side and has a positive power,
the fifth lens is configured from the meniscus lens having the convex surface on the object side, and
an aperture stop is arranged on the object side than the second lens.

* * * * *